United States Patent Office 3,647,910
Patented Mar. 7, 1972

3,647,910
DEHYDROGENATION OF HYDROCARBONS EMPLOYING A CATALYST OF IRON OXIDE-CONTAINING ACTIVATED CARBON
Arthur L. Jones, Solon, and Roger M. Benslay, Northfield, Ohio, assignors to The Standard Oil Company, Cleveland, Ohio
No Drawing. Filed Mar. 20, 1970, Ser. No. 21,540
Int. Cl. C07c *11/12*
U.S. Cl. 260—683.3 R                    9 Claims

ABSTRACT OF THE DISCLOSURE

Olefins, such as propylene, are produced by contacting a mixture of an alkane, such as propane, air, steam, and optionally hydrogen sulfide or sulfur dioxide with an iron oxide-containing activated carbon at an elevated temperature and recovering the product.

---

The present invention relates to a process for the dehydrogenation of hydrocarbons and more particularly pertains to a process for the dehydrogenation of hydrocarbons, particularly aliphatic hydrocarbons, by contacting a mixture of said hydrocarbon, air and steam with an activated carbon containing iron oxide at an elevated temperature and recovering the olefinic product.

U.S. Pat. No. 2,069,624 to Prutton et al. describes a process for producing isobutylene by pyrolyzing isobutane over a body of activated charcoal which is maintained within the temperature range of 500° C. to 600° C. During pyrolysis of the isobutane, the activated charcoal gradually loses its activity as a catalyst, with the result that the proportion of isobutane undergoing reaction in a single pass decreases slowly. When necessary, the charcoal may be reactivated by heating it to about 700° C. or thereabove and passing a slow stream of superheated steam through the same, care being taken to avoid excessive loss of charcoal by oxidation.

U.S. Pat. No. 2,131,089 to Beeck et al. describes the dehydrogenation of isobutane to isobutylene over activated charcoal and with steam and optionally with hydrogen sulfide.

In the present invention a mixture of steam, air, optionally $H_2S$ or $SO_2$ and a hydrocarbon is passed over an iron oxide containing activated carbon, at a temperature in the range of 570° F. to 1250° F., at, below or slightly above atmospheric pressure, and at a contact time in the order of from 0.1 second to 50 seconds, to produce an olefinic hydrocarbon. The process of the present invention produces olefin in good yield and conversion over long, continuous operating times with periodic (after about each 300 hours on stream) catalyst regeneration required. The process of this invention has the added advantage of being an exothermic reaction which supplies its own heat of reaction and can be carried out after start-up without the need for any external heat.

The steam used in the present process must be present in at least a 1.5:1 mole ratio of steam to hydrocarbon. Mole ratios above 1.5:1 can be used advantageously, and the upper limit of steam will be governed primarily by the economics of the process. The air used in this process must be present in at least a 0.05:1 mole ratio of air to hydrocarbon and preferably a mole ratio of from 0.2:1 to 0.5:1. The use of very high levels of steam or air will necessarily decrease the level of hydrocarbon employed and resulting olefinic product. The use of excessively high levels of air will result in the burning of some of the activated carbon.

The hydrocarbon useful in the present invention is preferably an aliphatic hydrocarbon. Useful aliphatic hydrocarbons are those containing from 3 to 12 carbon atoms and mixtures thereof; and these include propane, the butanes, the pentanes, the hexanes, the heptanes, the octanes, the nonanes, the decanes, the undecanes and the dodecanes. More preferred are aliphatic hydrocarbons having from 3 to 7 carbon atoms and most preferred are propane, the butanes and the pentanes.

The present invention is advantageously applied in a process for the dehydrogenation of propane to form propylene. Thus, the invention will be described with primary reference to the dehydrogenation of propane.

The uses of various olefins are numerous and are applied with success in a wide variety of industries including the petroleum, petrochemical, heavy chemical, pharmaceutical, plastics industry, etc. For example, propylene is utilized in the manufacture of isopropyl alcohol, propylene dimer, trimer and tetramer, acrylonitrile, polypropylene, propylene oxide, cumene, glycerine, acrolein, acrylic acids, acrylic esters, ethylene-propylene rubbers, isoprene and other materials. Butene-1, cis-cutene-2 and trans-butene-2 are used extensively in polymer and alkylate gasolines, in the manufacture of polybutenes, butadiene, aldehydes and alcohols, as solvents, cross-linking agents for polymers and in the synthesis of various $C_4$ and $C_5$ derivatives. Isobutene finds use in the production of isooctane, butyl rubber, polyisobutene resins, tertiary butyl chloride, copolymer resin with butadiene, acrylonitrile, etc. Pentenes are primarily employed in organic synthesis, although alpha-n-amylene (1-pentene) is often used as a component blending agent for high octane motor fuel.

Olefins can be produced from paraffins by pyrolysis or by dehydrogenation. Pyrolysis of paraffins such as ethane, propane, butanes and the like is carried out at temperatures in the range of 1380° F. to 1655° F. to produce primarily ethylene. During the pyrolysis reaction the higher olefins and paraffins suffer degradation. Thus, pyrolysis of propane and butanes produces ethylene primarily and catalytic dehydrogenation must be used for these higher paraffins. Catalytic dehydrogenation of paraffins produces olefins having the same number of carbons as the paraffins.

Catalytic dehydrogenation of propane to propylene has heretofore not been done on a large scale. The dehydrogenation of propane to propylene over a chromia-alumina catalyst has been previously described, but there has been no commercial installation of this process because the cyclic adiabatic train of reactors required is an expensive installation; and steam cannot be used in the presence of the chromia-alumina catalyst because it causes catalyst deactivation under the reaction conditions. The catalytic dehydrogenation of butanes and higher paraffins is done commercially, usually over a chromia-alumina catalyst.

The prior art processes for dehydrogenation are replete with examples of numerous other catalysts which can be used in promoting low temperature conversion of aliphatic hydrocarbons to olefins. Such catalysts generally consist of one or more metallic components from the metals of Groups VI and VIII of the Periodic Table and compounds thereof. Such are employed either unsupported, generally in powder or small particle form, or supported or carried by a refractory oxide material.

Notwithstanding the wide variety of suitable dehydrogenation catalysts, it becomes evident from a perusal of the prior art that any proposed catalyst appears to have inherently one or more drawbacks which detract from the suitability and acceptability thereof. Some are too active, and to the extent that undesirable side reactions are promoted even at low temperatures. Others are too inactive at low temperatures to promote an acceptable degree of dehydrogenation. Still others are insufficiently stable to be effective for an extended period of time, and as such, do not foster a commercially attractive process.

In conjunction with the various difficulties involved in selecting a suitable catalyst, there is the aspect of equilibrium to consider. Dehydrogenation is generally effected at conditions including a temperature in the range of from 752° F. to about 1290° F., a pressure from 0 to 100 pounds per square inch gauge, a liquid hourly space velocity within the range of from about 1.0 to about 10.0 and in the presence of hydrogen in an amount to result in a mole ratio of from 1:0 to about 10:1 based upon the paraffin charge rate. The degree of equilibrium conversion available is directly affected by changes in any one operating variable and can be controlled to a certain extent by the selective co-action of all the variables. When operating at or extremely close to equilibrium conversion, regardless of the character of the prior art catalyst being used or the degree to which it successfully effects dehydrogenation, various side reactions, including at least some cracking, are also effected. These side reactions have an adverse effect on the efficiency of conversion to the desired olefin as well as the economics of the process. On the other hand, our catalyst differs from other dehydrogenation catalysts in that no structural isomerization occurs when our catalyst is used to dehydrogenate aliphatic hydrocarbons. No normal butane is produced when isobutane is dehydrogenated over our catalyst, for instance.

Although the use of active carbon has been disclosed as a catalyst for the dehydrogenation of paraffins such as isopentane, n-butane and isobutane, the use of iron oxide containing activated carbon has not been disclosed. In no instance has any dehydrogenation process for producing propylene from propane over an active carbon catalyst containing iron oxide in the presence or even in the absence of steam or air been described or even suggested.

The instant process can be carried out at temperatures well below 1290° F. for extended periods of time with only a slow decline in the catalytic activity of the iron oxide containing activated carbon. The catalyst can be regenerated to its original activity by heating in the presence of steam and a small amount of air for a short time at an elevated temperature (1470° F.–2000° F.).

At the present time propylene is produced in refineries primarily as a co-product with ethylene by thermal cracking of higher hydrocarbons. Furthermore, output of product propylene from refineries will continue to decline as refiners use more hydrocracking and fully convert to the synthetic zeolite catalysts used in fluid bed cracking. Such catalysts produce 5 percent to 20 percent less propylene under typical operating conditions than do other catalysts used in cracking. Growing demand in both chemical and refinery processes for propylene points to production of propylene for its own sake and the instant process will make such production directly from propane possible.

The primary object of the present invention is to provide a paraffin dehydrogenation process, i.e., propane to propylene, which can function at close to equilibrium conditions without suffering from an excessive degree of side reactions or catalyst degradation leading to decreased efficiency, or cracking which causes the formation of by-products and deposition of carbon onto and within the catalyst, thereby shielding the active surfaces and centers thereof from the material being processed.

The activiated carbon useful in this invention is any form of carbon produced by destructive distillation of wood, peat, lignite, anthracite, nut shells, corn cobs, bones, vegetables, organic polymers, both natural and synthetic, or other carbonaceous matter, including liquid petroleum fractions, which contain iron oxide, i.e., $Fe_2O_3$, $FeO$, and other forms, which is activated. Iron oxide is conveniently deposited on active carbon by impregnating the carbon with an aqueous solution of a soluble iron salt, such as $Fe(NO_3)_3 \cdot 9H_2O$, and the carbon is dried under vacuum at an elevated temperature and in the presence of oxygen or air. The iron nitrate is converted to the oxide. Small amounts of other metal oxides, such as chromium oxide and potassium oxide, may serve as promoters with the iron oxide and can be included in the catalyst of this invention. Activation of the carbon, which is usually done before the iron oxide is incorporated therein, is achieved by heating the carbon to high temperatures (1290° F. to 1840° F.) with steam, with mixtures of steam and oxygen or with carbon dioxide, as is well known in the art, and in some cases hydroscopic substances, such as zinc chloride and/or phosphoric acid or sodium sulfate, are added prior to the destructive distillation or activation. The carbon content of activated carbon ranges from about 10 percent for bone charcoal to 98 percent for some wood chars. The density of activated carbon ranges from 0.08 to 0.6.

This invention is further illustrated in the following examples wherein the amounts of materials are expressed in parts by weight unless otherwise indicated.

EXAMPLE 1

A catalyst composed of a ferric nitrate impregnated activated carbon was prepared by treating an activated carbon (Nuchar WV–L) with an aqueous solution of $Fe(NO_3)_3 \cdot 9H_2O$. A standard solution of $Fe(NO_3)_3 \cdot 9H_2O$ was prepared by dissolving 378 grams of $Fe(NO_3)_3 \cdot 9H_2O$ in distilled water and diluting the solution to 500 mls. This is the equivalent of 15 grams of $Fe_2O_3$ per 100 mls. of solution. 33 mls. of this solution were diluted to 200 mls. with distilled water and this was added to 100 grams of the activated carbon. The mixture was stirred thoroughly and was then allowed to stand at ambient temperature and pressure for several days. The liquid was then removed from the carbon by decantation, the carbon was rinsed once with 200 mls. of distilled water and was then dried under vacuum at an elevated temperature of 800° F. The catalyst was then ready to use.

In this manner active carbons having 0 percent, 2.5 percent, 4 percent, 5 percent and 7.5 percent (by weight) $Fe_2O_3$ on them were prepared and used along with the untreated active carbon in this example.

The reactor was a tube 12 inches long with an internal diameter of ⅞ inch and constructed of stainless steel. The $Fe(NO_3)_3$ treated active carbon or active carbon per se was placed in the reactor to a bed depth of 6 to 8 inches, and the reactor was heated and maintained at reaction temperature by means of a radiant heat electric furnace. Experiments were carried out at substantially atmospheric pressure and temperatures in the range of 572° F. to 1202° F. Gaseous paraffins, such as propane, air and steam, were introduced at the bottom of the reactor through an inlet tube and the reaction gases passed upwards through the heated activated carbon bed and out of the top of the reactor. The application of air and heat converts the $Fe(NO_3)_3$ on the carbon to iron oxides, primarily $Fe_2O_3$. The treated and untreated activated carbon was coarse enough not to be carried out of the top of the reactor with the effluent gases. The product gases were withdrawn from the top of the reactor through a single line which passed through a water cooled condenser which caused separation of the steam from the hydrocarbon gases. Periodic analysis of the product gas stream was made by gas chromatography.

The paraffins used, such as propane, were C.P. grade (99+ percent pure). Calibrated rotameters were used to measure the rates of the paraffin feed. Steam rates were measured and controlled by means of a calibrated metering pump for distilled water. After distilled water was metered it was vaporized and introduced into the reactor.

The total volume of product gases was measured by means of a wet-test meter. The percentage of all components in the product gas stream was determined by gas chromatography. Mass spectrometer analyses were used for confirmation. The conversion represents the percentage of the paraffin charged which is converted to other products. The percent selectivity is the percentage of the specified olefin converted divided by the fractional weight of the total products.

In this manner experiments were run on the dehydrogenation of propane to propylene at a reaction temperature of 1120° F. using a feed of 100 cc. of propane per minute, 33 cc. of air per minute and 155 cc. of steam per minute. Table I gives the conversion (total propane converted per pass), selectivity to propylene (percent of propane converted going to propylene) and yield of propylene (conversion×selectivity).

TABLE I

| | Percent $Fe_2O_3$ on active carbon | | | | |
|---|---|---|---|---|---|
| | 0 | 2.5 | 4 | 5 | 7.5 |
| Conversion, percent | 24.5 | 34.2 | 34.8 | 39.4 | 38.0 |
| Selectivity, percent | 61.7 | 75.4 | 77.7 | 74.5 | 70.0 |
| Yield, percent | 15.10 | 25.79 | 27.04 | 29.35 | 26.60 |

EXAMPLE 2

The procedure of Example 1 was repeated using activated carbon per se described in Example 1, the 5 percent by weight $Fe_2O_3$ on activated carbon described in Example 1, and a silica gel treated with 10 percent $Fe(NO_3)_3 \cdot 9H_2O$ (equivalent to 4 percent $Fe_2O_3$) as described for the activated carbon treatment in Example 1, and several reaction temperatures were investigated. The activated carbon used was Columbia ACC. The catalyst weight was 45 grams; the feed was composed of 100 cc. per minute of propane, 33 cc. per minute of air and 155 cc. per minute of steam. The weight of feed per weight of catalyst per hour (w.w.h.) factor was 0.245. The results of these experiments are given in Table II.

TABLE II

| | Percent | | | | | |
|---|---|---|---|---|---|---|
| | Untreated active carbon | | $Fe(NO_3)_3 \cdot 9H_2O$ treated active carbon | | $Fe(NO_3)_3 \cdot 9H_2O$ treated silica gel | |
| Temperature, ° F. | Conversion | Selectivity | Conversion | Selectivity | Conversion | Selectivity |
| 950 | 5.5 | 95 | 17 | 92.5 | | |
| 1,000 | 8.2 | 91.8 | 22.1 | 89.0 | 2.38 | 78.2 |
| 1,050 | 13.2 | 86.5 | 27.8 | 85.3 | 4.64 | 64.2 |
| 1,100 | 25.2 | 76.2 | 35.3 | 78.9 | 8.10 | 56.8 |
| 1,130 | 36.3 | 68.2 | 43.0 | 72.0 | 11.50 | 52.0 |

EXAMPLE 3

The procedure of Example 1 was repeated using the 5 percent $Fe_2O_3$ containing activated carbon as catalyst and isopentane as the hydrocarbon reactant. The reaction was carried out at 1000° F. using as feed a mixture of 100 cc. per minute of isopentane, 33 cc. per minute of air and 155 cc. per minute of steam. The pentenes were recovered in the following yields: 3-methyl butene-1 (3.8 percent), 2-methyl butene-1 (7.4 percent) and 2-methyl butene-2 (21.7 percent). The conversion of isopentane was 43.0 percent and the selectivity to pentenes was 76.0 percent.

EXAMPLE 4

The procedure of Example 3 was repeated using isobutane in place of isopentane and a reaction temperature of 1050° F. The main olefin products were isobutylene and propylene. The total conversion of isobutane was 45.3 percent selectivity to isobutylene was 79.2 percent and selectivity to combined isobutylene and propylene was 84.3 percent.

EXAMPLE 5

The effect of including $SO_2$ in the feed in the dehydrogenation of propane was determined using the procedure of Example 1 employing as catalyst of this invention the activated carbon which contained the equivalent of 2.5 percent $Fe_2O_3$. The feed was composed of 100 cc. per minute of propane, 33 cc. per minute of air, 155 cc. per minute of steam and 20 cc. per minute of $SO_2$. The reaction temperature was 1130° F. A total conversion of propane of 51.2 percent was obtained with a selectivity of 76.4 percent to propylene.

EXAMPLE 6

The procedure of Example 5 was repeated except that the activated carbon containing 5 percent $Fe_2O_3$ was used and the feed contained 40 cc. per minute of $H_2S$ in place of the 20 cc. per minute of $SO_2$. A total conversion of 44.5 percent propane was obtained with a selectivity of 77.2 percent.

EXAMPLE 7

The procedure of Example 1 was repeated using the catalyst containing 5 percent $Fe_2O_3$ which had also been treated to contain 1 percent chromium and 0.5 percent potassium as promoters. The reaction temperature was 1130° F. A total conversion of 51 percent of propane was obtained with a selectivity to propylene of 67.3 percent.

EXAMPLE 8

A non-activated petroleum coke carbon was used in place of the activated carbon in the procedure of Example 1. The reaction was carried out at a temperature in the range of 1140° F. to 1200° F. When petroleum coke per se was used as catalyst, a total conversion of propane of 6.5 percent was obtained with a selectivity of 59.5 percent to propylene. When 5 percent $Fe_2O_3$ on petroleum coke was used as catalyst, a total conversion of 6.8 percent propane was obtained with a selectivity to propylene of 57.6 percent. This example illustrates that the carbon employed in this invention must be an activated carbon.

EXAMPLE 9

The procedure of Example 1 was repeated using a reaction temperature range of 1100° F. to 1210° F. and employing the catalyst containing 5 percent $Fe_2O_3$ on activated carbon. The selectivity and conversion of propane to propylene were excellent, and it was found that the reaction could be carried on for several thousand hours continuously with only a slight decline in conversion and selectivity near the end of each 500-hour period. The catalyst was easily regenerated back to its original activity each time by treatment with air and steam at 1500° F. for about 20 hours.

We claim:

1. The process for preparing an olefin comprising passing a mixture of an aliphatic hydrocarbon containing from 3 to 12 carbon atoms, a molecular oxygen-containing gas and steam over an iron oxide-containing activated carbon at a temperature in the range of 570° F. to 1250° F. at a contact time in the order of from 0.1 second to 50 seconds and recovering the olefin product.

2. The process of claim 1 wherein the molecular oxygen-containing gas is air.

3. The process of claim 2 wherein the steam is present in at least a 1.5:1 mole ratio of steam to hydrocarbon.

4. The process of claim 3 wherein the air is present in at least a 0.05:1 mole ratio of air to hydrocarbon.

5. The process of claim 4 wherein the aliphatic hydrocarbon has from 3 to 7 carbon atoms.

6. The process of claim 5 wherein the aliphatic hydrocarbon is propane.

7. The process of claim 5 wherein the aliphatic hydrocarbon is isobutane.

8. The process of claim 1 wherein the mixture also contains hydrogen sulfide.

9. The process of claim 1 wherein the mixture also contains sulfur dioxide.

References Cited

UNITED STATES PATENTS

| | | | |
|---|---|---|---|
| 1,881,692 | 10/1932 | Krauch et al. | 260—683.3 |
| 3,113,984 | 12/1963 | Gosselin et al. | 260—677 |
| 1,678,078 | 7/1928 | Ramage | 260—683.3 |
| 1,752,692 | 4/1930 | Ramage | 260—683.3 |
| 2,069,624 | 2/1937 | Prutton et al. | 260—170 |
| 2,007,754 | 7/1935 | Feiler et al. | 260—683.3 |

DELBERT E. GANTZ, Primary Examiner

J. M. NELSON, Assistant Examiner

U.S. Cl. X.R.

260—677